Figure 4:
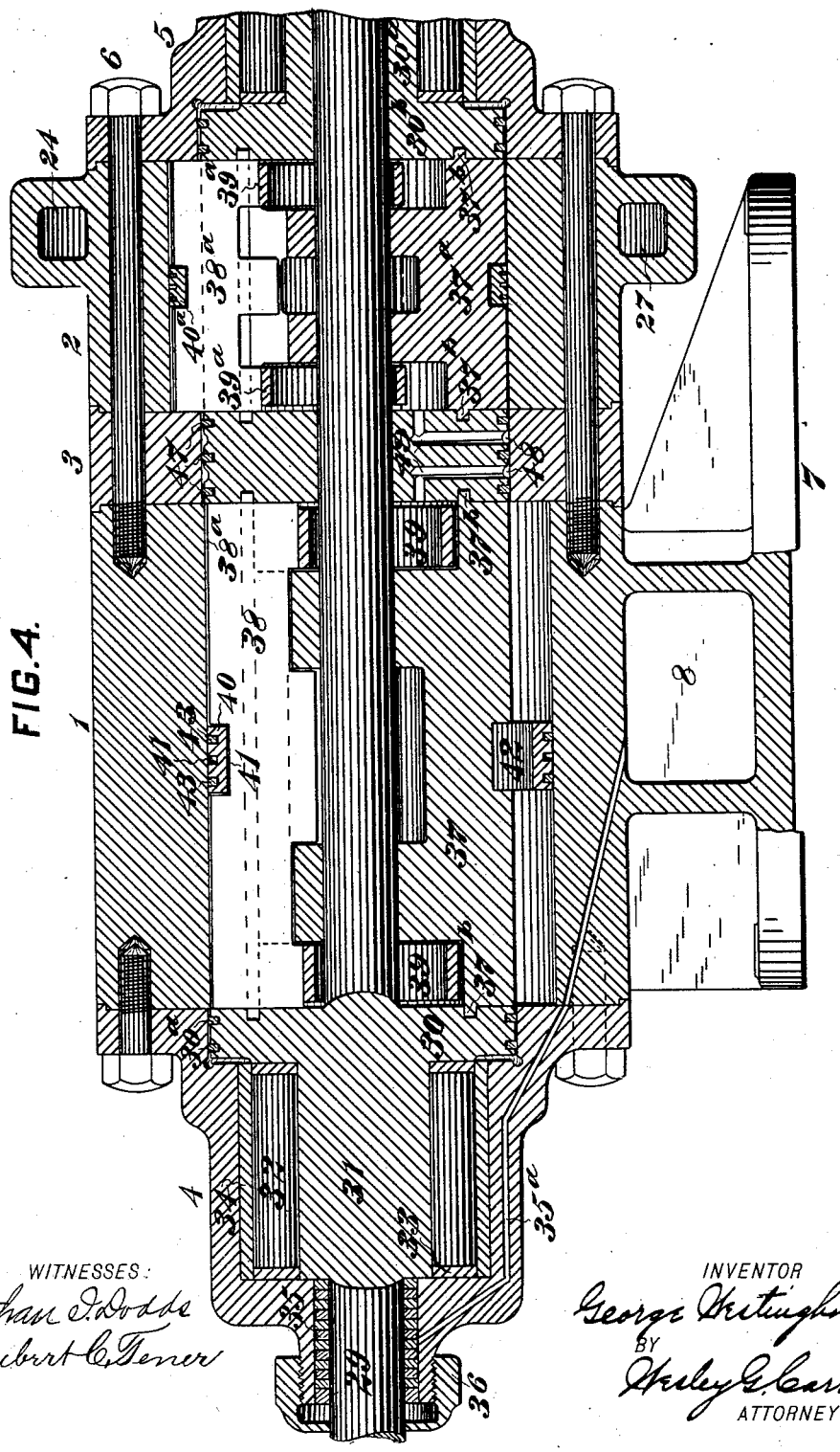
Figure 8:
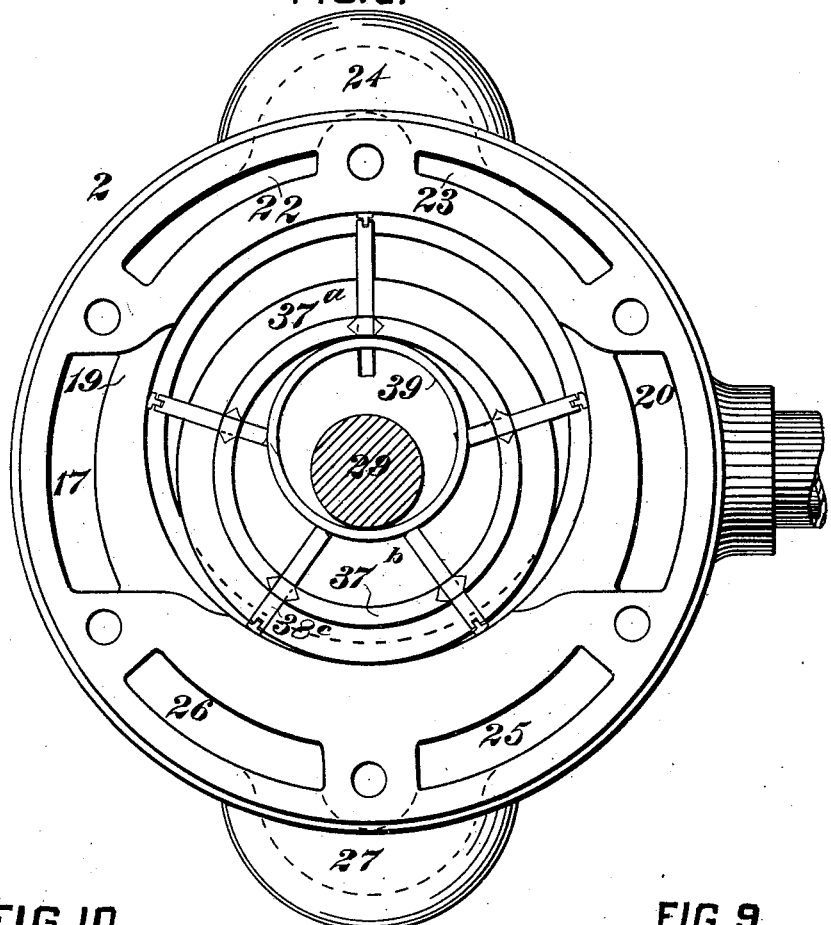

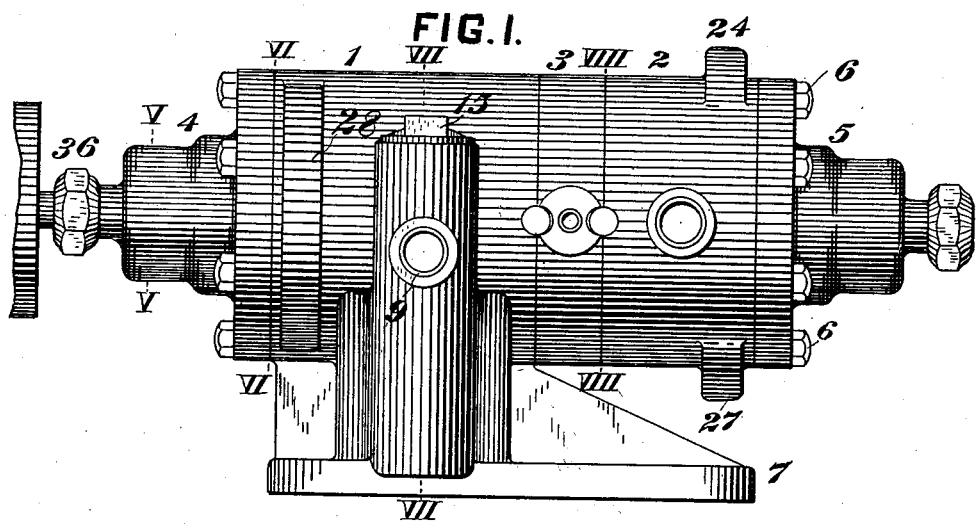

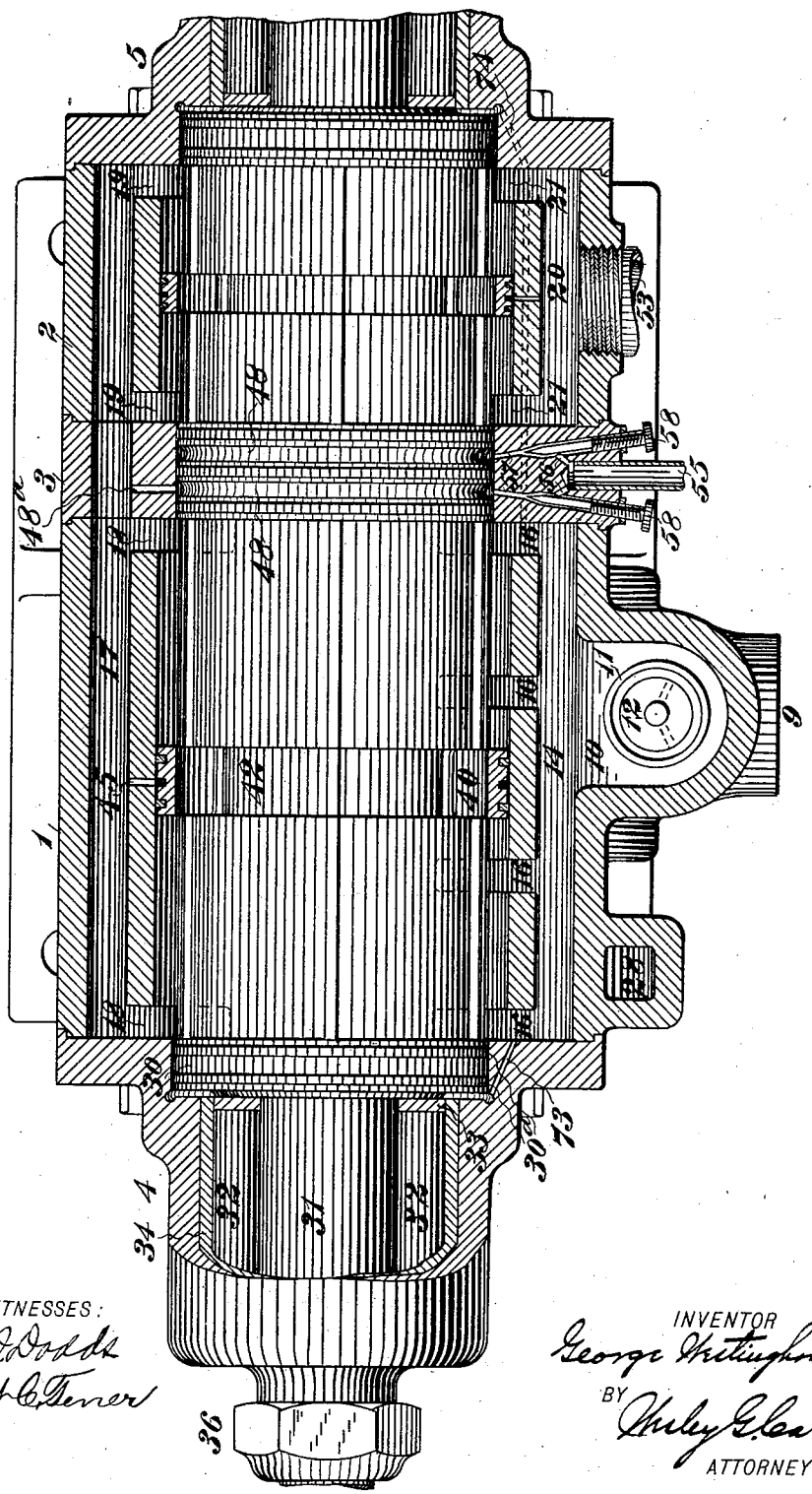

No. 672,970. Patented Apr. 30, 1901.
G. WESTINGHOUSE.
ROTARY MOTOR OR PUMP.
(Application filed Apr. 9, 1898.)
(No Model.) 9 Sheets—Sheet 3.

WITNESSES: INVENTOR
George Westinghouse
BY
Attorney.

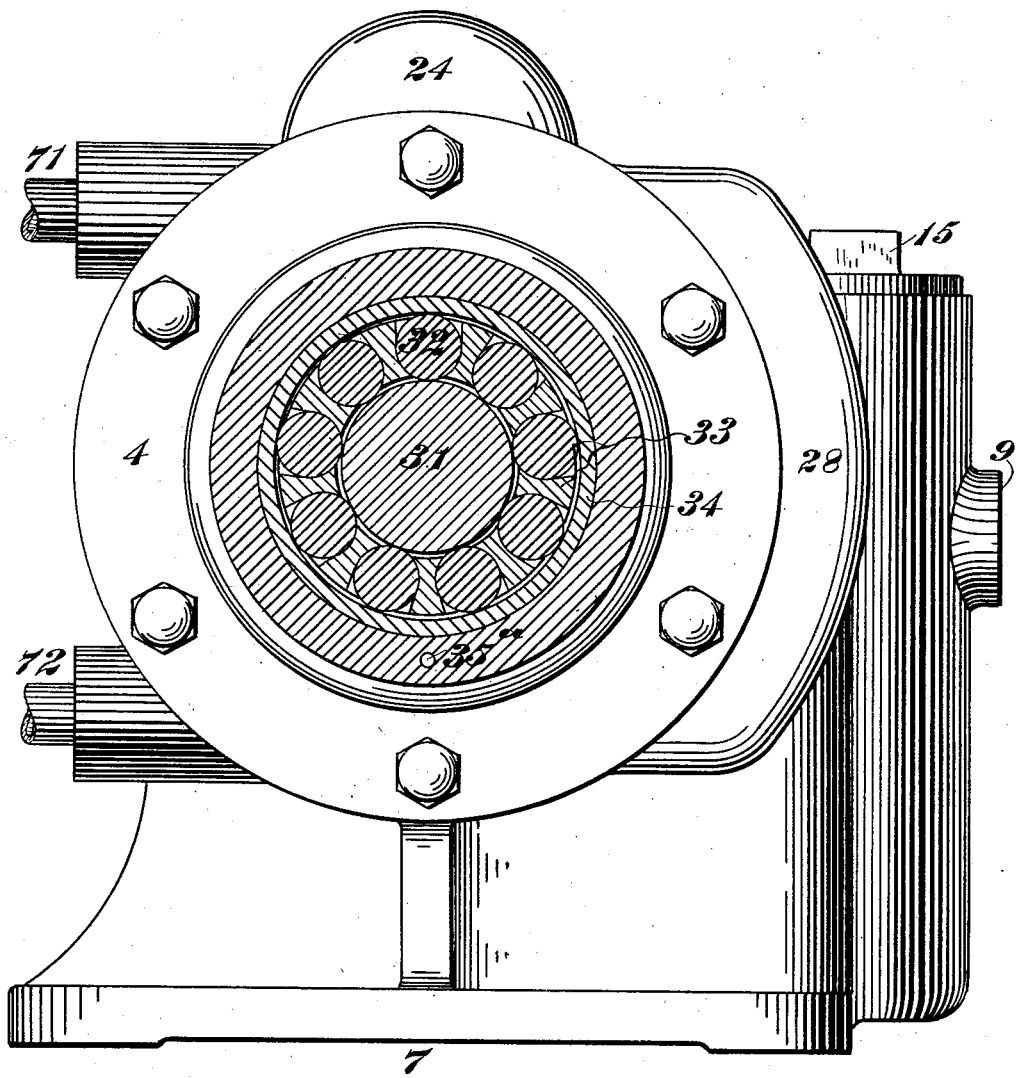

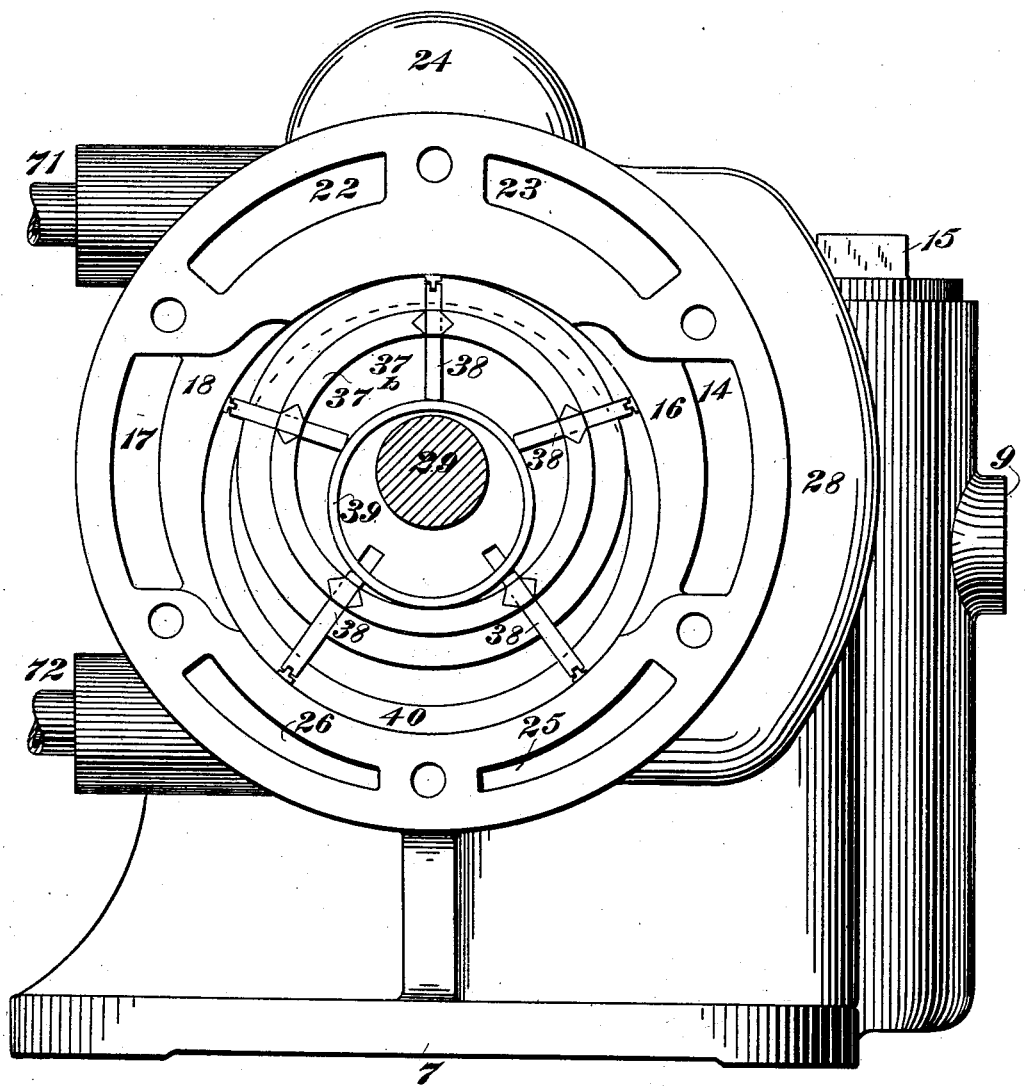

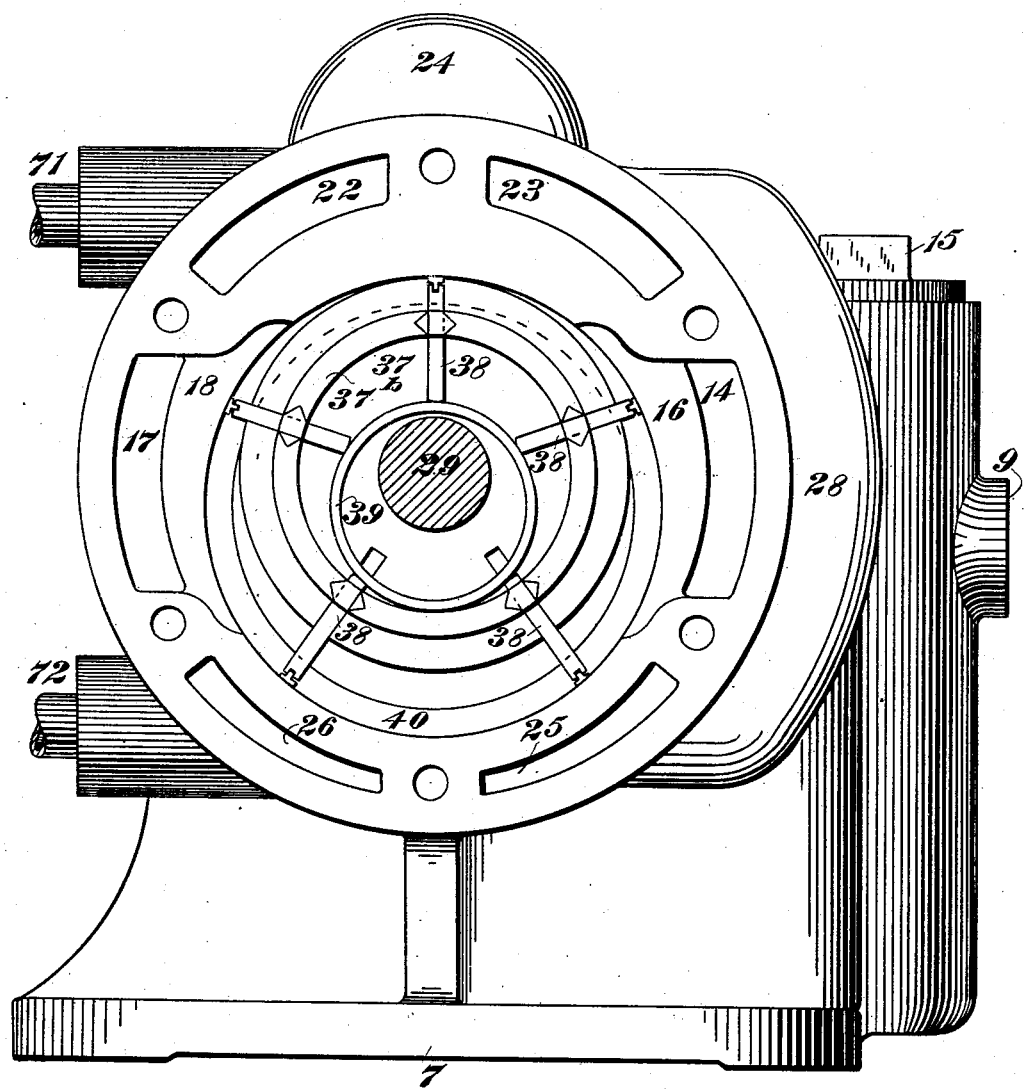

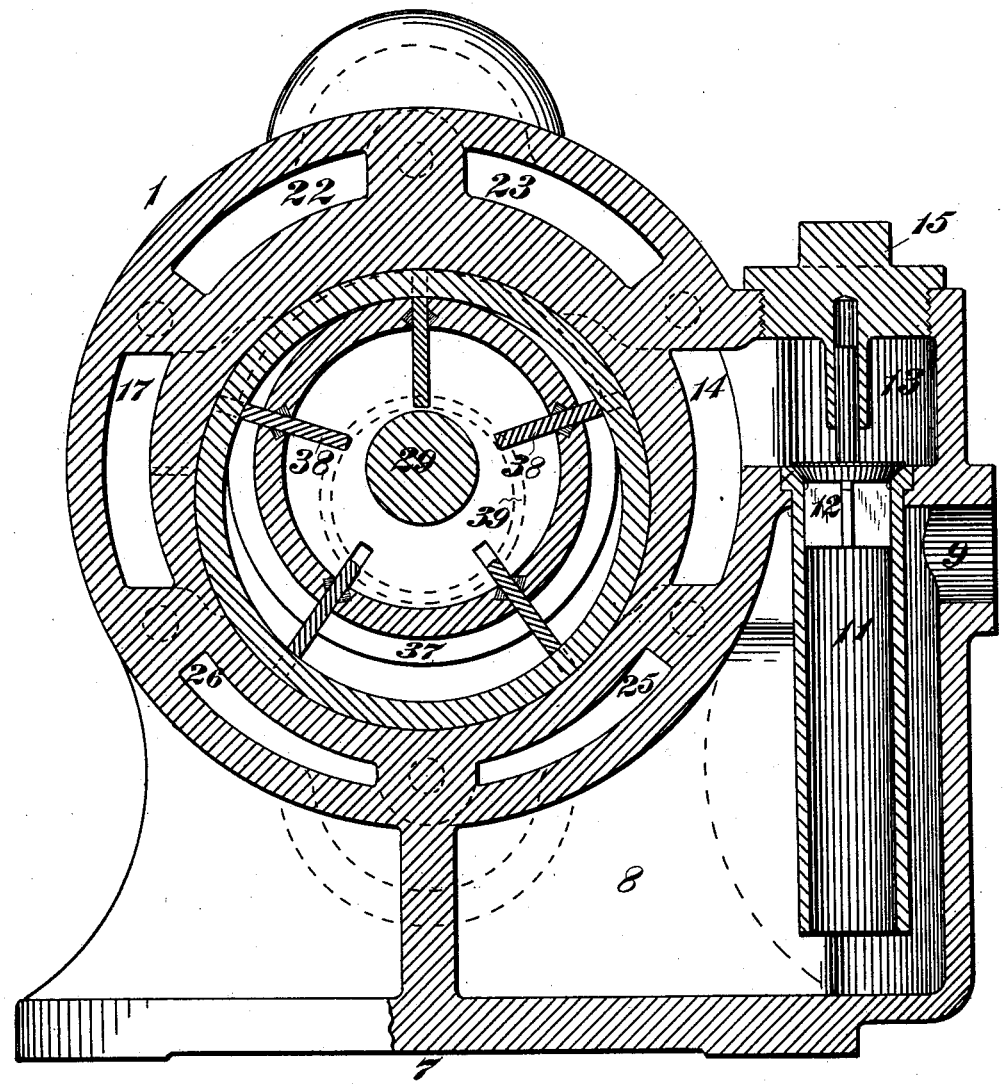

No. 672,970. Patented Apr. 30, 1901.
G. WESTINGHOUSE.
ROTARY MOTOR OR PUMP.
(Application filed Apr. 9, 1898.)

(No Model.) 9 Sheets—Sheet 7.

WITNESSES:
Ethan D. Dodds
Hubert C. Tener

INVENTOR
George Westinghouse
BY
Shirley G. Carr
ATTORNEY.

THE NORRIS PETERS CO., PHOTO-LITHO., WASHINGTON, D. C.

No. 672,970. Patented Apr. 30, 1901.
G. WESTINGHOUSE.
ROTARY MOTOR OR PUMP.
(Application filed Apr. 9, 1898.)

(No Model.) 9 Sheets—Sheet 8.

WITNESSES:
Ethan I. Dodds
H. C. Tener

INVENTOR
George Westinghouse
BY
Wesley G. Carr
ATTORNEY.

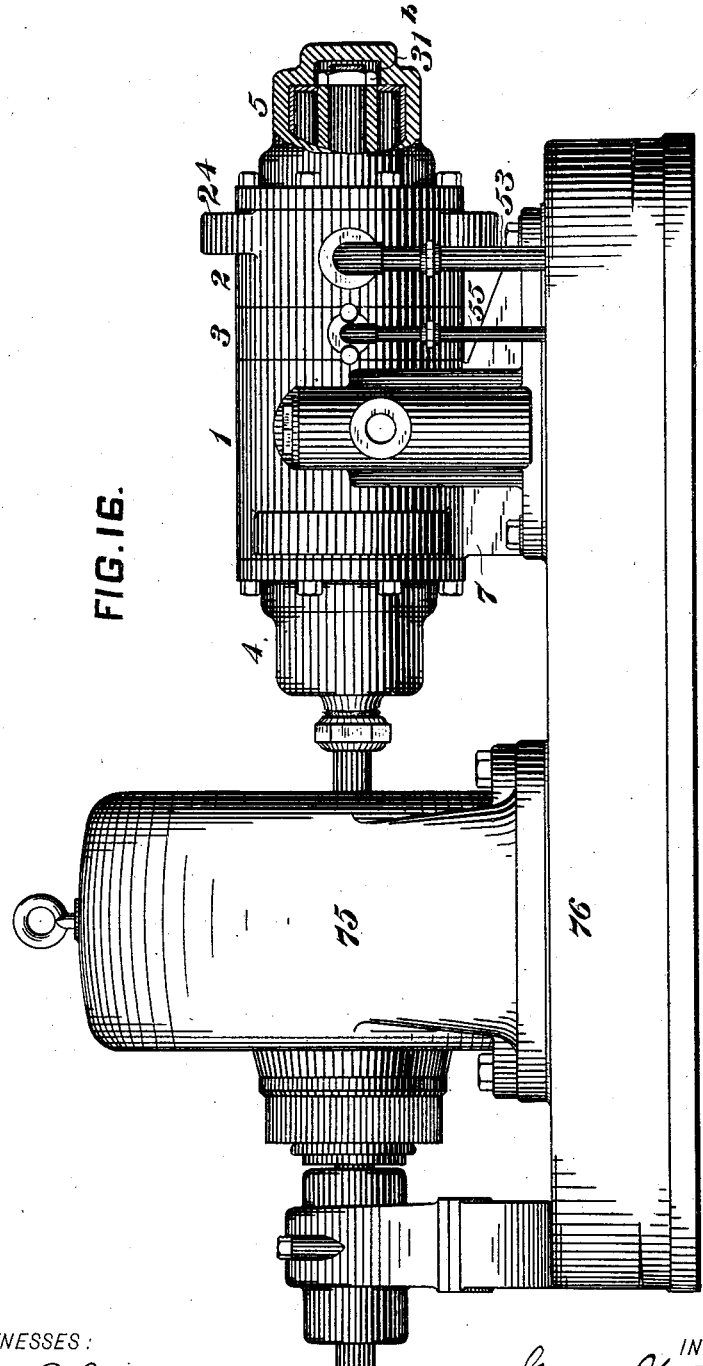

UNITED STATES PATENT OFFICE.

GEORGE WESTINGHOUSE, OF PITTSBURG, PENNSYLVANIA.

ROTARY MOTOR OR PUMP.

SPECIFICATION forming part of Letters Patent No. 672,970, dated April 30, 1901.

Application filed April 9, 1898. Serial No. 677,078. (No model.)

*To all whom it may concern:*

Be it known that I, GEORGE WESTINGHOUSE, a citizen of the United States, residing in Pittsburg, in the county of Allegheny and State of Pennsylvania, have invented a new and useful Improvement in Rotary Motors or Pumps, of which the following is a specification.

My invention relates to rotary motors or pumps, and has particular reference to the class of machines structurally represented by Patent No. 455,028, granted to me June 30, 1891.

The object of my invention is to provide a compact and durable machine which may be operated efficiently as a motor by means of steam, compressed air, or other fluid, or which may be driven mechanically or by hand as a pump.

The machine forming the subject-matter of the above-mentioned patent was primarily intended for use as a steam-engine and embodied a construction which was intended to materially reduce the friction between the rotating pistons and their inclosing cylinder. The construction whereby these results were effected comprised a cylindrical rotatable bushing between the outer edges of the pistons and the inner wall of the cylinder and a steam-packing between the bushing and the cylinder, whereby the rotation of the bushing was effected substantially without contact between it and the cylinder. My present invention contemplates the employment in lieu of the bushing of the said patent of one or more rotatable rings symmetrically located with reference to the ends of the rotating drum which carries the piston-slides and between the said slides and the bore of the cylinder. By means of this construction I am enabled to greatly simplify and cheapen the construction and at the same time to reduce the friction between the movable and stationary parts.

My invention also comprises a means for and a method of utilizing oil or some other suitable liquid for packing a rotary air-pump, so as to prevent leakage, and consequently to greatly increase the efficiency of such pumps beyond what has been heretofore accomplished.

My invention comprises also means for cooling the engine and other constructions and combinations of parts, which will be hereinafter described, and particularly pointed out in the claims.

Figure 10:
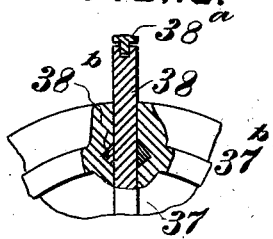
Figure 11:
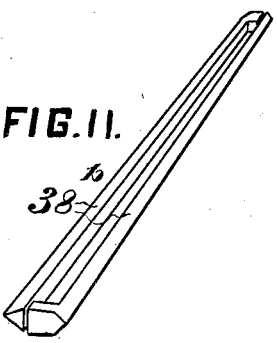
Figure 9:
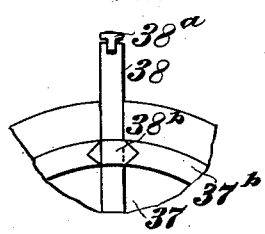
Figure 12:
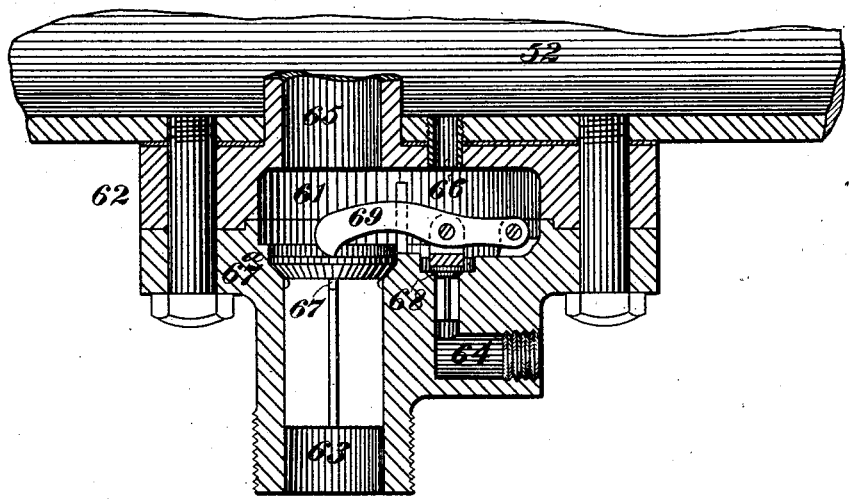
Figure 13:
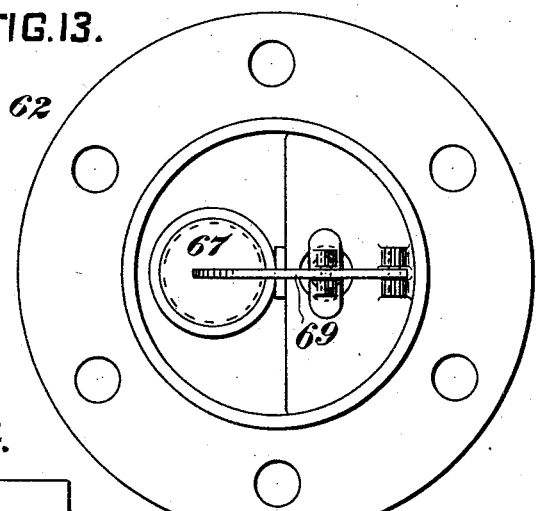
Figure 14:
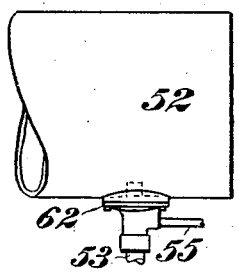
Figure 15:
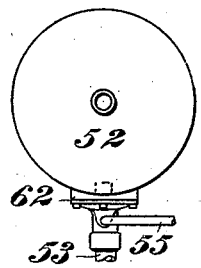

In the accompanying drawings, Figure 1 is a side elevation of a motor or pump constructed in accordance with my invention. Fig. 2 is a plan view of the machine shown in Fig. 1 in combination with air and water reservoirs and fluid-conducting pipes. Fig. 3 is a view of the pump or motor partially in plan and partially in horizontal longitudinal section, a portion of the shaft bearings and casting at one end being broken away. Fig. 4 is a vertical longitudinal section through the pump or motor, a portion of the shaft bearings and casing at one end being broken away. Figs. 5, 6, 7, and 8 are transverse sections taken, respectively, on lines V V, VI VI, VII VII, and VIII VIII of Fig. 1. Fig. 9 is a detail side elevation of a portion of the drum, one of the piston-slides, and the coöperating packing-strips. Fig. 10 is a similar view, but partially in section. Fig. 11 is a perspective view of a pair of packing-strips employed in connection with the piston-slides. Fig. 12 is a vertical longitudinal section of the lower portion of the air-reservoir, the air and oil chambers and passages connected therewith, and the controlling-valves. Fig. 13 is a plan view of the air and oil valves and casing detached from the reservoir. Fig. 14 is a side elevation of one end of the air-reservoir, and Fig. 15 is an end elevation of the same. Fig. 16 is a side elevation of an electric motor and a pump mounted upon a single base and directly coupled together.

The apparatus embodying my invention will for convenience be described in detail as an air compressing and storing apparatus, but without in any wise limiting the invention to such use.

The pump shown and described herein is of the compound double-cylinder type, though many of its novel features are applicable to and intended for use in machines having more than two cylinders, as well as those having only one.

The casing of the pump comprises a low-pressure cylinder 1, a high-pressure cylinder 2, and an intermediate annular partition-plate 3. A head 4 is bolted to the outer end of the cylinder 1, and a similar head 5 is bolted to the outer end of cylinder 2. The fastening-bolts 6 for the head 5 may, as shown, extend through the wall of cylinder 2 and plate 3 and into those of cylinder 1. The base 7 may be cast integral with the cylinder 1, as indicated in the drawings, or, if preferred, it may be a separate casing. This casing also embodies a chamber 8, which is provided at one side with an inlet-opening 9. Just above the opening 9 is a partition 10, provided with an opening, in which is located the upper end of a tube 11. This tube projects nearly to the bottom of the chamber 8 and is provided at its top with an upwardly-opening check-valve 12 in order to prevent the escape of air and liquid when the pump is not in operation. A small chamber 13 above valve 12 is in open communication at one side with a chamber 14, which is located in the side wall of cylinder 1 and extends the entire length of the same. The chamber 13 is closed at its top by a screw-cap 15, which is provided with a guiding-socket for the stem of the valve 12. The chamber 14 communicates with the interior of the cylinder 1 by means of four ports 16, although the number may be more or less than four, if desired.

In the walls of the casing opposite to chamber 14 is a similar chamber 17, which extends longitudinally through the parts 1, 2, and 3 for the entire distance between the heads 4 and 5, though the portions corresponding to the two cylinders 1 and 2 may be separated by the plate 3 and a connecting-passage provided outside of said plate, if desired. This chamber 17 communicates with the interior of cylinder 1 by means of two ports 18, located at its ends, and with the interior of cylinder 2 by means of two ports 19, located at its ends. The size, number, and location of these ports may obviously be varied from what is shown, if desired. A chamber 20, similar to chamber 14 and in longitudinal alinement therewith, is located in the side wall of cylinder 2 and communicates with its interior by means of ports 21, the number and location of which may be varied to suit the conditions met with in practice. The casing-walls contain also, in the top portion between the chambers 14 and 17, two chambers 22 and 23, which extend from end to end between the heads 4 and 5 and are connected at the outer end of cylinder 2 by a by-pass 24. In the bottom portion of the casing-walls are two chambers 25 and 26, which also extend from end to end between heads 4 and 5 and are connected at the outer end of cylinder 2 by a by-pass 27. Chambers 23 and 25 are connected by a by-pass 26 at the outer end of cylinder 1. The function of these chambers, the connections between the same, and the coöperating external apparatus will be hereinafter described. A shaft 29 extends through the cylinders 1 and 2 and the annular partition-plate 3, and within the head 4, adjacent to the outer end of cylinder 1, it is provided with a circular plate 30. This plate is provided with packing-rings 30$^a$ and may be either rigidly fastened to the shaft or formed integral with it, as shown. The plate 30 forms part of a head, a portion 31 of which is of less diameter and is surrounded by a series of bearing-rollers 32, preferably mounted in a cage 33, as is usual in such constructions. The chamber in which these bearing-rollers are located is preferably lined with a steel bushing 34, which may be hardened, if desired. The shaft 29 is continued beyond the cage 33 and the bearing-rollers 32 for the purpose of receiving a pulley or coupling device. In order to guard against any egress of air and to avoid friction between this end of the shaft and the head 4, several packing-rings 35 are provided, some of them fitting tightly into the head and the others being of a slightly-less external diameter and fitting closely upon the shaft. As the two sizes alternate with each other, a slight degree of play is possible, and the cylinder 1 is rendered substantially air-tight. Other forms of packing may be employed, however, in lieu of that shown.

The casing may contain a passage 35$^a$, leading from the packing-rings 35 to the chamber 8 in order that any lubricating and packing liquid which passes the bearings may flow back into said chamber to be again used in the pump.

A drum of the same diameter as the plate 30 is mounted upon the shaft 29 and is provided with a plurality of slots, five being shown in the drawings. In these slots are located piston-slides 38, which move radially in the slots as the drum rotates.

While the radial arrangement of slots and piston-slides is regarded as preferable, the machine would be operative if this arrangement were not strictly adhered to.

Each piston-slide may be provided at its outer edge with radially-movable packing-strips 38$^a$, (see Figs. 9 and 10,) which are automatically adjusted by centrifugal force, so as to make close contact with the inner periphery of the cylinder.

The drum is provided at its ends adjacent to the shaft 29 with recesses or cavities, in which are located rings 39. These rings being located between the inner edges of the slides 38 serve to maintain the outer edges of said slides very nearly in contact with the inner periphery of the cylinder 1.

The drum 37 is provided at each side of each piston-slide with a passage or opening which is of triangular shape in cross-section, and in each of these openings is located a triangular strip 38$^b$, having a head at one end, (see Figs. 9, 10, and 11,) the heads of the strips of each pair being reversely located, so that the end of each strip projecting beyond the slide is flush with and rests laterally against the head on the other strip. The centrifugal force exerted when the drum is in motion tends to force these strips 38$^b$ outward radially, and by reason of the inclination of their outer sides they are pressed inward against the slides, so as to afford a good packing without materially impeding the in-and-out movement of the slides.

A balancing-ring 40, the external diameter of which is slightly less than the bore of the cylinder 1, is located in said cylinder midway of its ends, so that it will revolve freely, each of the piston-slides being provided with a recess 41 for receiving it. The depth of each recess is slightly less than the thickness of the ring in order that the slides may bear against the ring instead of against the surface of the cylinder. The drum 37 is also provided with a circumferential recess 42 for the reception of the balancing-ring 40.

It will be understood that the annular recess for the reception of the ring 40 may be in the cylinder instead of in the drum and slides, if desired. It would also obviously be feasible to locate the ring partially in a cylinder-recess and partially in drum and slide recesses or to employ a plurality of rings symmetrically located with reference to the ends of the drum in lieu of the single ring shown. The exterior surface of this balancing-ring 40 is provided with packing-rings 43. The ring 40 may also be provided with an annular groove 44, which is in open communication with chamber 17 by means of a passage 45. As the packing-rings 43 prevent the passage of any fluid from the interior of the cylinder to the space between them and the passage 45 places the groove 44 in communication with the chamber of cylinder 1, having the highest pressure, a substantial equality of pressure is maintained between the ring 40 and the contiguous surface of the cylinder throughout the circumference. By proportioning this ring 40 with reference to the centrifugal force exerted upon and through the slides and the area of the slots in which the slides operate the various forces acting upon the ring within the cylinder may be so counterbalanced that no appreciable pressure is exerted by the ring upon the bore of the cylinder at any point. The friction between the ring and the cylinder is therefore so reduced that the former is caused to rotate freely between the inner surface of the cylinder and the slides 38.

The centrifugal force exerted upon the ring through the slides and the lateral pressures exerted upon the latter while in operation cause the slides to regulate the movement of the ring, so that the latter rotates at a somewhat less speed than that of the drum.

That portion of the shaft which is located in cylinder 2 is provided with a drum $37^a$, which does not differ except in length from the drum 37; but the bore of the cylinder is for convenience and simplicity of construction so located with reference to the shaft of the drum that the eccentricity is opposite to that above described. The piston-slides $38^c$, their packing-strips, the bearing-ring $40^a$, and its packing-rings and groove are the same in form and function as those above described and differ therefrom only in dimensions.

A plate 46 of the same thickness as the annular partition-plate 3 and of the same diameter as the drums 37 and $37^a$ is mounted upon the shaft 29, between the said drums. This plate is provided with three packing-rings 47 and with two annular grooves 48, which are located between the packing-rings and communicate with the interiors of the drums 37 and $37^a$ by means of passages 49. (See Fig. 4.) The groove 48, which communicates with the interior of drum 37, may communicate with chamber 17 by means of a passage $48^a$ in order to establish an equilibrium of fluid-pressure between the interior of the said drum and the said chamber.

Each of the drums 37 and $37^a$ is provided at each end with an annular centering-tongue $37^b$. These annular tongues fit into corresponding grooves in the plates 30, $30^b$, and 46 and have recesses for the reception of the heads and contiguous projecting ends of the packing-strips $38^b$ at the sides of the slides 38.

A head comprising a plate $30^b$ of the same diameter as the drums 37 and $37^a$ and a reduced bearing portion $31^a$ is mounted upon the end of shaft 29 and within the head 5. This head $30^b$ $31^a$ is like the head 30 31, except that it is removable from the shaft. A nut $31^b$ (not shown except in Fig. 16) is screwed upon the end of the shaft and serves to clamp the plates 30, $30^b$, and 46 and the drums 37 and $37^a$ rigidly together.

The bearing-rollers, cage, and bushing in the head 5 are the same as the corresponding parts in the head 4.

52 is an air-reservoir, which may be either the main reservoir or an auxiliary reservoir, into which the air is forced through a pipe 53, past a check-valve 54 contained therein, by the compound pump above described. A smaller pipe 55 leads from the air-reservoir 52 to the partition 3 between the cylinders 1 and 2 and is connected with the grooves 48 in the plate 46 by passages 56 and 57, in the latter of which may be located screws 58 for regulating the amount of lubricating and packing liquid supplied to the machine. The inlet-pipe 59, leading to the low-pressure cylinder 1, may be provided with a suitable check-valve 60 and its inner end is connected to the inlet-opening 9.

In order to prevent a backflow of air and liquid from reservoir 52 when the pump is not in operation, I may use the combined air and liquid check-valve. (Shown in Figs. 12 and 13.) A chamber 61 is formed in a two-part casting 62, which is bolted to the under side of the reservoir, as shown. The lower portion of this casting contains the tubes or passages 63 and 64 with which the pipes 53 and 55 are respectively connected.

From the upper side of chamber 61 lead air-conducting tube 65 and liquid-conducting tube 66, the former projecting a short distance above the bottom of the reservoir. The upper end of tube 63 is normally closed by a valve 67, and the upper end of the tube 64 is normally closed by a similar valve 68. A small lever 69 is pivoted at one end to a suitable lug at one side of chamber 61. The other end of said lever is located above and nearly in contact with valve 67. Valve 68 is pivoted to the lever 69 at a point between its ends. The seat for the valve 67 is located at the bottom of a cylindrical recess 67$^a$ in order that the valve may be compelled to move a considerable distance from its seat before air can pass by it into the reservoir. When the pump ceases to act, the valve 67 drops to its seat, thereby seating the valve 68, and thus retaining the air and liquid which had been previously pumped.

70 is a water tank or reservoir which is connected at its top to the chamber 22 in the pump-walls by means of a pipe 71 and at its bottom with chamber 26 by a pipe 72. (See Figs. 2 and 6.) The water passes from the reservoir through the pipe 72 into the chamber 26 and flows through it lengthwise to and through the by-pass 27 at the outer end of cylinder 2, into and through the chamber or passage 25, to the outer end of cylinder 1, through the by-pass 28 at that end to the chamber or passage 23, thence to the outer end of cylinder 2, through the by-pass 24 to chamber or passage 22, and thence back to the pipe 71, through which it passes into the top of water-reservoir 70. The circulation of the water through the various passages described is effected by reason of the heat generated in the machine and serves to keep the temperature down to a safe limit. Water may be supplied to these passages from any suitable source other than that shown.

The operation of the apparatus above described when employed for pumping and compressing air is as follows: The shaft 29 being rotated by means of power applied through a belt (not shown) to the pulley 73, air will be taken in through the pipe 59 and valve 60, the vertical tube 11, chamber 14, and inlet-ports 16 into the cylinder and will be forced, by means of the piston-slides 38, through the lower half of the cylinder and the outlet-ports 18 into the chamber 17, thence through the ports 19 into the upper portion of the high-pressure cylinder, around the upper portion of such cylinder by means of the piston-slides 38$^c$ therein, and out through the pipe 53 and into the air-reservoir 52. The liquid-valve 68 being raised by the movement of the valve 67 as air is forced into tube 63, liquid will flow out of reservoir 52 through tubes 66 and 64 and pipe 55 and through the passages 56 and 57 into the grooves 48 in the plate 46 and thence through the passages 49 in this plate 46 into the adjacent cavities in the drums 37 and 37$^a$.

It has been found in practice that if no provision is made against the leakage of air other than such as may be embodied in the mechanical construction the apparatus is inefficient. In order to prevent leakage of air, I therefore utilize a liquid packing, as above indicated, the liquid being utilized primarily as a packing and, if suitable in character, incidentally as a lubricant. The point of greatest leak in the apparatus being past the piston-slides into or through the drum 5, I have found it advantageous to introduce liquid under pressure into the interior of each drum in such quantities that it serves to act as a seal at all points where there is any tendency of the air to leak, the sealing action being materially aided by the centrifugal force resulting from the rotation of the drums.

I have found it desirable to have the pressure within each drum equal to the highest pressure produced by the pistons of the drum in their pumping action, and to attain this I have provided a passage 48$^a$ between the chamber 17 and the groove 48, which communicates with the interior of drum 37. This port or passage 48$^a$ is of sufficient capacity to insure a substantially equal pressure between the chamber 17 and the interior of the drum, so that, owing to centrifugal action, the liquid contents of the drum tend to always flow outward along the sides of all of the piston-slides. The quantity of liquid admitted into the interior of each drum is so proportioned or regulated as to maintain within the drum a sufficient amount for sealing purposes, for if a less amount should be admitted there would be a leakage of air between the piston-slides and the drum. If a surplus amount of liquid should be introduced into the groove 48, it would escape through the passage 48$^a$ into the chamber 17.

It follows from the foregoing that a portion of the liquid delivered into the interior of the drum passes by the slides and serves afterward to pack the interstices between the packing-strips 38$^a$ and the cylinder and the ring 40 and the piston-slides, and when the packing liquid is also a lubricant it effectively lubricates all of the operating parts.

In the case of the compound pump the liquid delivered by the pump into the chamber 17 enters the receiving-ports 19 of the high-pressure pumping-cylinder, and, combining with the supply of liquid which is fed into the interior of the drum of the high-pressure pump, it serves as a displacing liquid as well as a lubricant—i. e., the quantity of liquid taken into this high-pressure cylinder is so large that there is a considerable volume of liquid between the drum and the cylinder at the point where the drum is adjacent to the cylinder. The liquid that passes into the chamber 20 is obviously carried along with the compressed air into the reservoir 52 to be used again for packing purposes. The liquid admitted into the drum of the high-pressure cylinder is taken from the reservoir 52, and therefore the pressure acting within the interior of the high-pressure drum is substantially the same as the pressure produced by that drum in pumping.

If the quantity of liquid introduced at the points specified were only sufficient for lubricating purposes, the pump would not serve the purpose for which it is intended, it having been found in practice that when the supply of liquid has been cut off, although the pump has been well lubricated, its efficiency was reduced to such an extent as to render it impracticable for high-pressure-air pumping.

Both air and liquid are forced to a greater or less extent from the chambers 19 and 20 through the passages 45 into the grooves 44 in the peripheries of the rings 40, and thus serve to lubricate the outer surfaces of the rings. These passages 45 lead, preferably, as shown, to the points of highest pressure with reference to the respective cylinders.

As the drums and slides rotate they will also cause the rotation of the balancing-rings, but at a less speed, and on account of the balancing of pressures the drums and slides will rotate in the cylinders without appreciable friction. The air which is pumped through the low-pressure cylinder 2, as has already been stated, carries with it more or less of the lubricating and packing liquid which has been received from the air-reservoir. This liquid may pass to some extent by the packing-rings in the plates 30 and 30$^b$, and any liquid which does pass beyond these packing-rings will flow back through the passages 73 and 74 into the chambers 14 and 20, as indicated in Fig. 3. Any liquid which passes beyond the bearings in head 4 into the packing-rings 35 at the end of the machine will pass therefrom by the passage-way 35$^a$ into the chamber 8. When an appreciable amount of liquid accumulates in chamber 8, it will be drawn up, together with the air, through the tube 11 and be returned to the machine to be used over and over again for lubricating and packing purposes.

In Fig. 16 I have shown a pump like that hereinbefore described in combination with an electric motor 75, to which it is directly coupled. In this specification the motor and pump are both mounted upon a single base 76, which is made hollow for reservoir purposes, as may be found necessary or desirable in the service in which the pump and motor are employed.

It will be readily understood from the description of the apparatus that the machine described is in general adapted for use as a motor or as an engine and may be operated by either steam or compressed air, the valve 12 being removed and the operating fluid being supplied under pressure in the reverse direction to that hereinbefore described. When driven by air, the liquid packing may be omitted, or it may be provided for by constantly collecting the liquid which passes out of the exhaust of the engine and pumping it back to serve as a packing. When driven by steam, water under considerable pressure, such as results from condensation, may be used for packing purposes, or such packing may be dispensed with.

While I have found it advantageous to substantially equalize the fluid-pressure between the interior of each drum and the chamber into which its outlet-port opens, I desire it to be understood that my invention is not dependent upon or limited to such condition or to means for producing it. The pressure inside each drum may be the same as that existing in the receiving-reservoir or any other pressure that is either equal to or greater than that existing in its outlet-chamber.

I desire it to be understood that the details of construction and the arrangement of parts may be varied within considerable limits from what I have shown and described without departing from the spirit and scope of my invention.

I claim as my invention—

1. The combination with a cylinder, of a rotatable drum located eccentrically therein and provided with slots, piston-slides located in said slots, and a rotatable balancing-ring located between the slides and the cylinder and operating substantially as described.

2. The combination with a cylinder, of a rotatable drum located eccentrically therein and provided with slots, piston-slides located in said slots each of which is provided with a recess, and a rotatable balancing-ring fitting into said recesses and operating substantially as described.

3. The combination with a cylinder, of a rotatable drum located eccentrically therein and provided with slots, piston-slides located in said slots, each of which is provided with a recess, and a rotatable balancing-ring fitting into said recesses and having packing-rings in contact with the surface of the cylinder.

4. The combination with a cylinder, of a rotatable drum located eccentrically therein and provided with slots, piston-slides located in said slots, each of which is provided with a recess, and a rotatable balancing-ring fitting into said recesses and having packing-rings and an intervening groove in its outer periphery.

5. The combination with a cylinder, of a drum located eccentrically therein and provided with annular tongues at its ends, end plates having corresponding grooves in which said tongues fit, a rotatable balancing-ring in said cylinder and piston-slides located in slots in said drum and bearing against said ring.

6. The combination with a cylinder having inlet and outlet ports, of a drum eccentrically mounted therein and provided with piston-slides, a circumferentially-movable balancing-ring between said piston-slides and the surface of the cylinder and a plurality of laterally-movable rings between the inner edges of the piston-slides.

7. In a rotary pump or motor, the combination with a cylinder, of a balancing-ring and a drum having a circumferential groove to receive said balancing-ring and piston-slides provided at their outer edges with radially-movable packing-strips, substantially as and for the purpose set forth.

8. A rotary motor or pump comprising a drum, piston-slides located in slots in said drum and a longitudinal packing-strip for each side of each of said piston-slides having its outer sides inclined with reference to the sides of the slides and provided with a laterally-projecting head at one end.

9. A rotary motor or pump comprising a drum, piston-slides located in slots in said drum and triangular packing-strips located in similarly-shaped recesses in said drum and having laterally-projecting heads at alternate ends.

10. A rotary pump or motor comprising a drum having annular centering-tongues at its ends, piston-slides located in slots in said drum and a pair of packing-strips for each piston-slide provided with laterally-projecting heads located in corresponding recesses in said centering-tongues.

11. In a rotary pump or motor, the combination with a drum, of piston-slides located in slots in said drum and a pair of packing-strips for each of said piston-slides, each of said strips being of triangular shape in cross-section and having a laterally-projecting head at one end.

12. In a rotary pump or motor, a casing provided with a plurality of chambers extending longitudinally from end to end and alternately connected at opposite ends to form a single continuous zigzag chamber for the circulation of a cooling liquid, and inlet and outlet chambers for the actuated or actuating fluid.

13. The combination with a rotary air-pump, of an air-reservoir provided with an air-check valve movable through a short cylinder to its seat and liquid-check valve the movement of which depends upon the movement of the air-valve.

14. The combination with a rotary air-pump, of an air-reservoir provided with combined air and liquid check valves, a pipe connecting the air-valve with the outlet-chamber of the pump, a pipe connecting the liquid-valve with passages leading into the interior of the pump-drum and means for regulating the supply of liquid to said drum.

15. A compound rotary pump or motor comprising two cylinders arranged end to end the bores of which have non-coincident axes, drums in said cylinders having their axes in alinement and provided with piston-slides, inlet and outlet chambers in the walls of the cylinders and a plurality of ports connecting each chamber with the interior of the cylinders.

16. In a rotary pump, the combination with a rotatable drum provided with piston-slides and a non-rotatable cylinder surrounding the same, of a chamber having an air-inlet at or near its top, a vertical tube adjacent to said inlet and extending nearly to the bottom of said chamber and an upwardly-opening check-valve in the top of said tube.

17. In a compound rotary pump or motor, the combination with a shaft, two drums and an intervening plate mounted thereon, heads at the respective outer ends of the two drums one of which is movable longitudinally on the shaft and a nut for clamping said parts together.

18. In a rotary, eccentric-piston pump or motor, the combination with a cylinder or casing, a shaft extending through said cylinder or casing and located eccentrically therein, said shaft being enlarged at one end of the cylinder to form a head-plate, a drum provided with piston-slides and abutting at one end against said head-plate, a plate mounted upon the shaft at the other end of said drum and movable thereon, and means for clamping the drum between the said plates.

19. In a rotary eccentric-piston pump or motor, the combination with a cylinder or casing, a shaft located eccentrically therein and having a head at or near one end, a drum provided with piston-slides and abutting at one end against said head and a plate at the other end of the drum provided with passages for the introduction of liquid into the interior of the drum.

20. The combination with a reservoir containing a limited quantity of liquid suitable for packing purposes and an air-pump comprising a cylinder and a drum located eccentrically therein and provided with piston-slides, of an air-conducting pipe leading from the outlet-port of the pump to said reservoir and a liquid-conducting pipe and passages leading from said reservoir to the interior of the pump-drum, whereby liquid is forced into said drum to constitute a packing between the stationary and movable parts of the pump.

21. The combination with an air-reservoir containing a body of liquid suitable for packing purposes and an air-pump comprising a cylinder and a drum located eccentrically therein and provided with piston-slides, of an air-conduit leading from the outlet-port of the pump to said reservoir and terminating above the level of the liquid therein, and a liquid-conduit leading from the bottom of said reservoir to the interior of the pump-drum, whereby liquid is forced by air-pressure into said drum to constitute a packing between the stationary and movable parts of the pump.

22. The combination with an air-reservoir containing a limited quantity of liquid suitable for packing purposes and a pump comprising a cylinder and a hollow, rotatable drum located eccentrically therein and provided with piston-slides, of a valved air-conduit between the outlet-port of the pump and the reservoir and a valved liquid-conduit between the bottom of the reservoir and the interior of the pump-drum whereby a forced circulation of liquid effects a liquid packing between the movable and stationary parts of the pump.

In testimony whereof I have hereunto subscribed my name this 6th day of April, 1898.

GEO. WESTINGHOUSE.

Witnesses:
WESLEY G. CARR,
H. C. TENER.